United States Patent [19]
Burbury

[11] 4,152,604
[45] May 1, 1979

[54] COLLIMATOR CONTROL AND CASSETTE POSITION MONITOR FOR A DIAGNOSTIC X-RAY SYSTEM

[76] Inventor: Robert L. Burbury, 235 Ann St., South Elgin, Ill. 60177

[21] Appl. No.: 890,205

[22] Filed: Mar. 27, 1978

[51] Int. Cl.$^2$ ............................................... G11B 1/00
[52] U.S. Cl. ................................... 250/402; 250/468; 250/511
[58] Field of Search ............... 250/401, 402, 468, 511, 250/512, 513

[56] References Cited

U.S. PATENT DOCUMENTS 3,581,094   5/1971   Peyser ................................. 250/511

Primary Examiner—Craig E. Church
Attorney, Agent, or Firm—Leydig, Voit, Osann, Mayer & Holt, Ltd.

[57] ABSTRACT

An improved collimator control and cassette position monitor for a diagnostic X-ray system. The system includes a position sensing cassette holder or tray which produces a pair of analog voltages corresponding to a long and a cross edge of a cassette in the holder. The collimator control includes a plurality of window detectors for comparing the analog voltages against fixed references corresponding to standard cassette sizes properly centered. If the cassette is properly centered a window detector for the long and for the cross edge will be satisfied, and the digital signals produced by those detectors will control the collimator servo system to establish the X-ray field size. If the cassette is not properly centered either or both of the long and cross window detectors will fail to produce an output. The system will respond to that condition by disabling the X-ray generator and providing a cassette position fault indication, thereby informing the operator to check the cassette position in the holder. The system minimizes the number of repeat exposures and thereby the radiation dosage to a patient.

21 Claims, 8 Drawing Figures

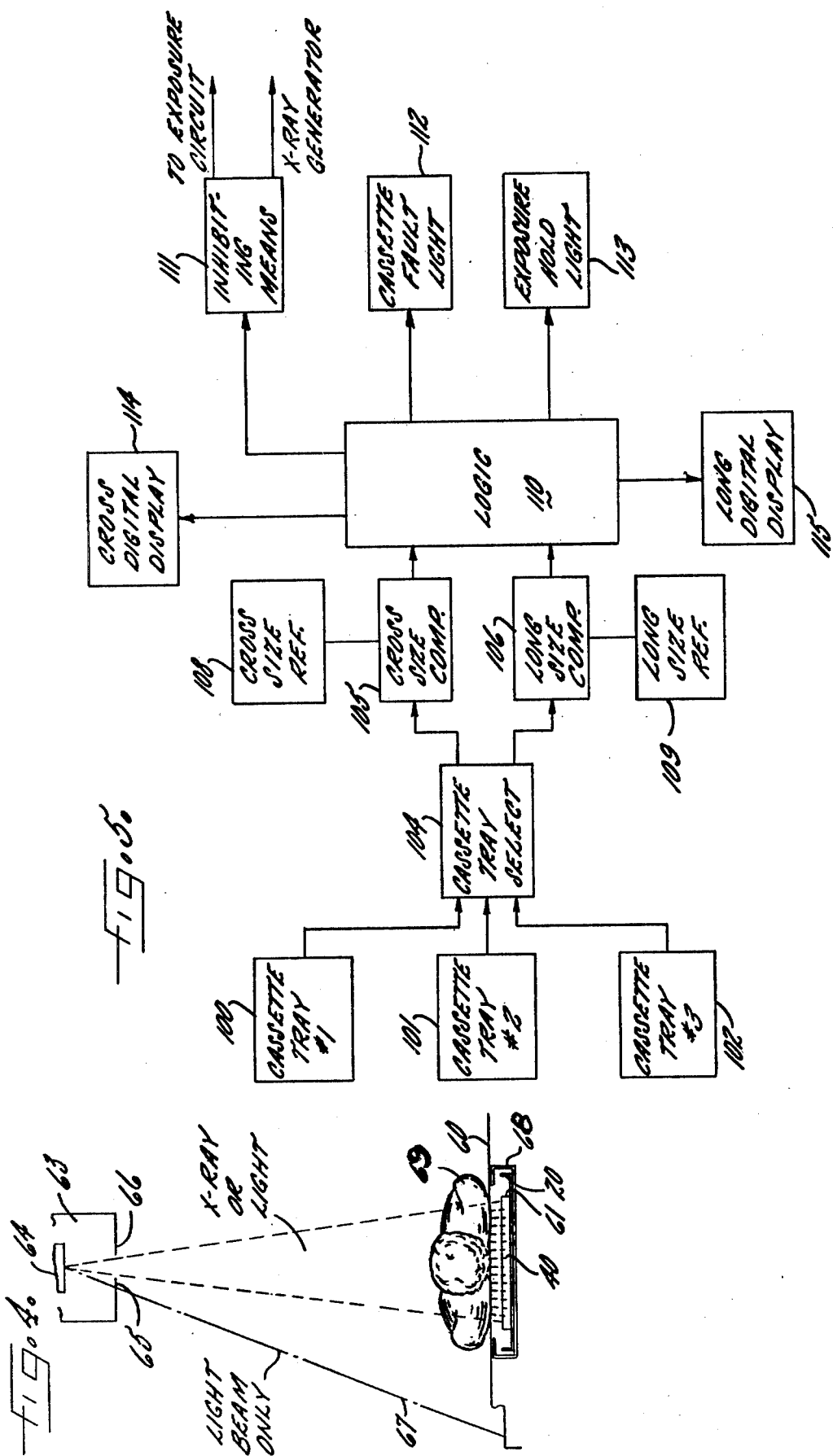

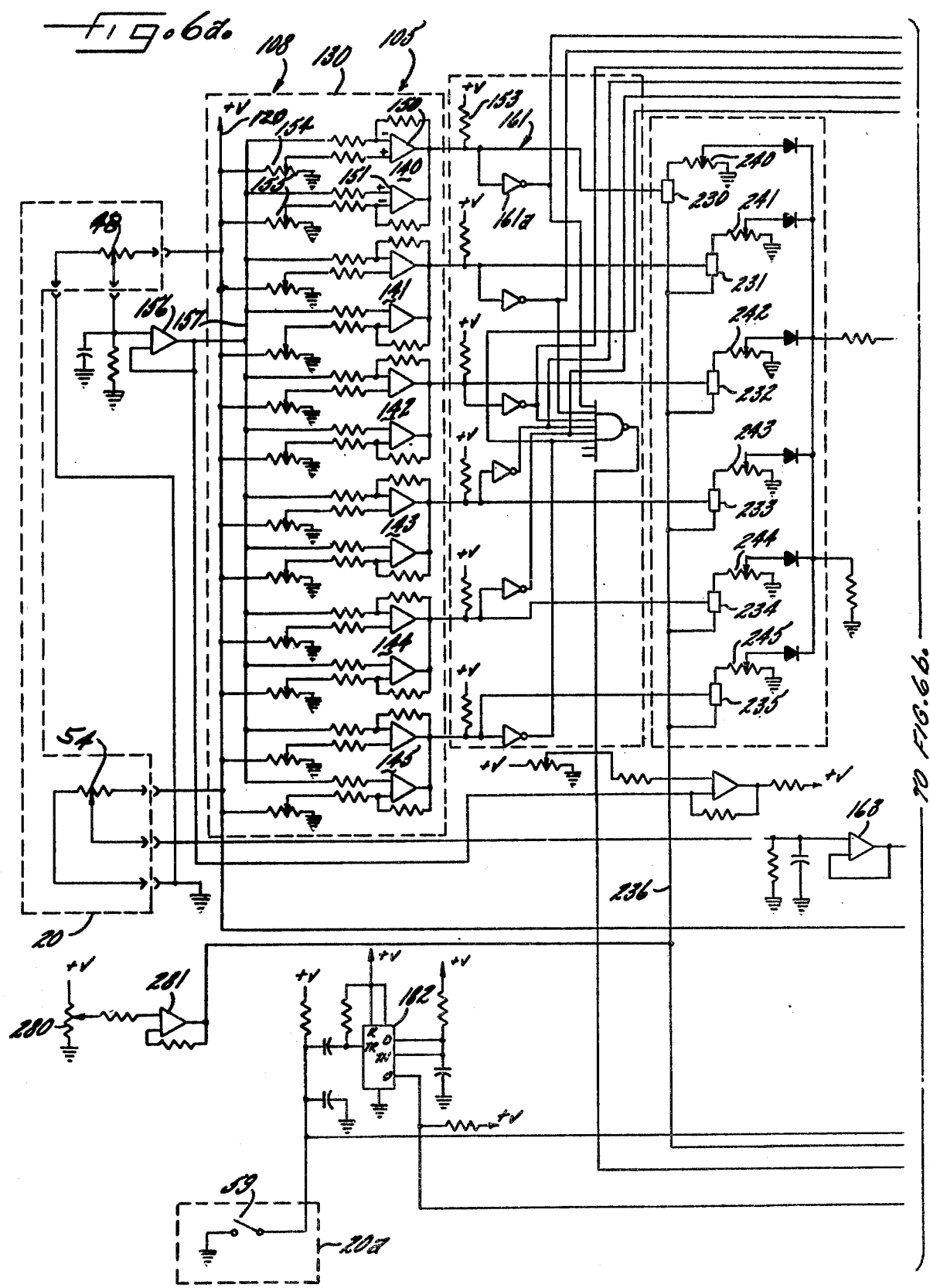

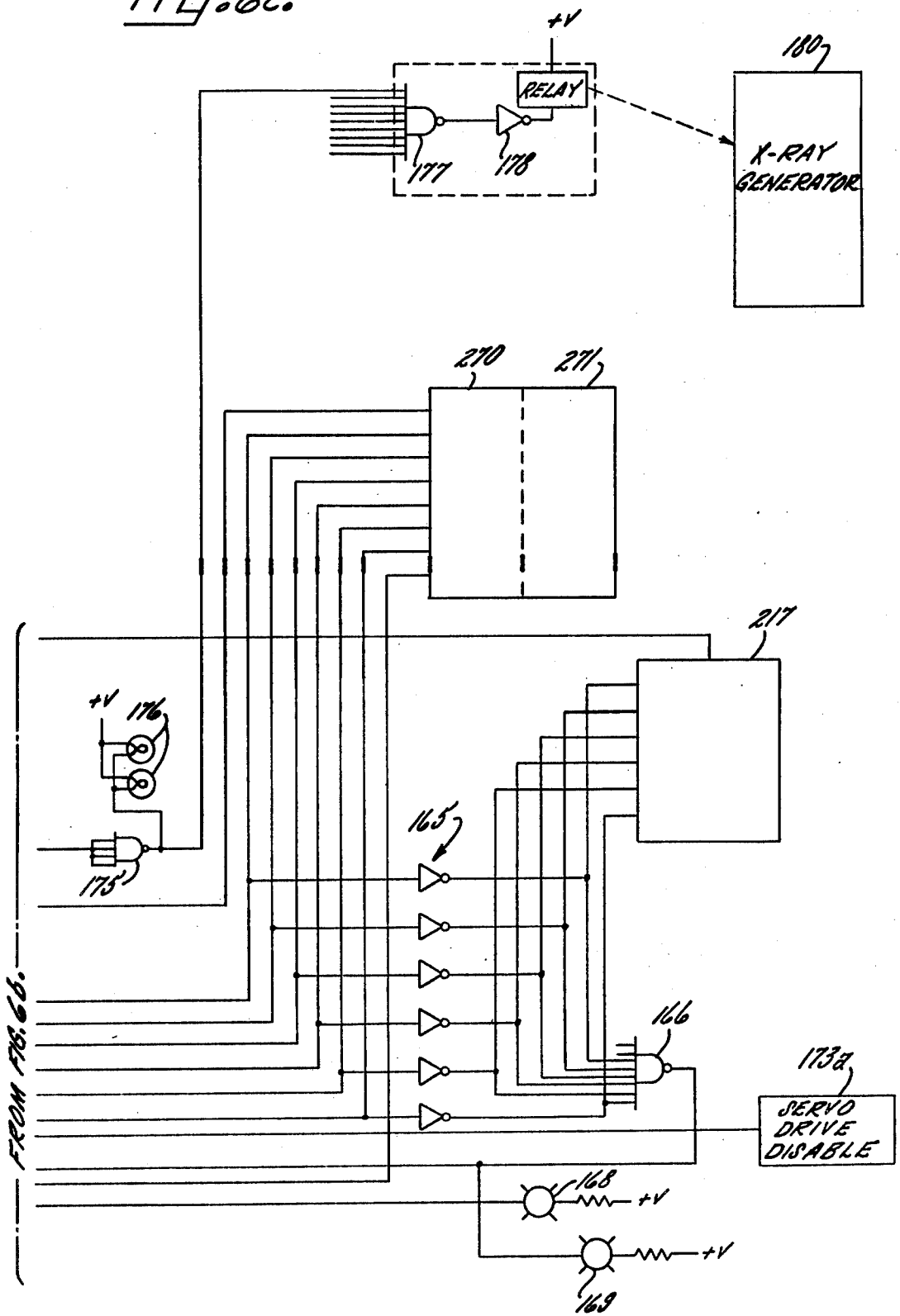

COLLIMATOR CONTROL AND CASSETTE POSITION MONITOR FOR A DIAGNOSTIC X-RAY SYSTEM

This invention relates to diagnostic X-ray systems and more particularly to an improved collimator control and cassette position monitor.

In diagnostic X-ray systems, the X-ray film is conventionally carried in a cassette, and a number of standard size cassettes with associated film sizes are available, a particular one being selected in dependence on the size of area to be X-rayed. Automatic collimator systems have been devised to conform the field of the X-ray to the cassette film size in order to minimize the X-ray dosage to a patient. In addition, cassette size sensing trays have been devised for use with positive beam limitation devices or collimator system. These cassette trays typically include a pair of pots or a series of switches for sensing a long and cross edge of the cassette tray and providing an analog voltage corresponding to the position of the sensed edges. Conventionally these voltages are used in a servo loop for controlling the long and cross collimator blades in order to match the area of the X-ray field to the film size being used.

In such systems, however, due to the fact that only two cassette edges are sensed, if the cassette is not properly centered false information will be fed to the collimator servo system. Underframing, overexposure and/or lost information are the result, with the ultimate result being the need for a retake and an additional dose of radiation to the patient.

In view of the foregoing it is an aim of the present invention to minimize radiation dosage to the patient by providing a system which insures cassette centering before an exposure is allowed. It is a further object to accomplish that aim using conventional cassette size sensing trays, but using the voltages produced thereby in a novel manner to assure that the cassette is centered.

It is a more detailed object of the invention to provide a cassette position monitor having a plurality of window detectors for sensing the analog voltages produced by a cassette size sensing tray, and establishing the windows in narrow ranges about the voltages corresponding to standard cassette sizes so that an improperly centered cassette will fail to actuate the associated window detector, thereby providing a fault indication. In that connection, it is a further object to disable the X-ray generator in the absence of a properly centered cassette.

According to another aspect of the invention it is an object to provide a collimator control for a diagnostic X-ray system wherein the collimator servo system is driven from a selected one of a plurality of internally set references, the references being digitally selected by the aforementioned window detectors.

Other objects and advantages will become apparent from the following detailed description when taken in conjunction with the drawings in which:

FIG. 4 is a schematic view showing the relationship between the X-ray source, collimator blades, patient and cassette;

FIG. 5 is a block diagram showing an X-ray system including a position monitor according to the present invention; and FIGS. 6a–6c when joined form a circuit diagram of a collimator control and position monitor constructed in accordance with the present invention.

While the invention will be described in connection with a preferred embodiment, there is no intent to limit it to that embodiment. On the contrary, the intent is to cover all alternatives, modifications and equivalents falling within the spirit and scope of the invention as defined by the appended claims.

Figure 1:
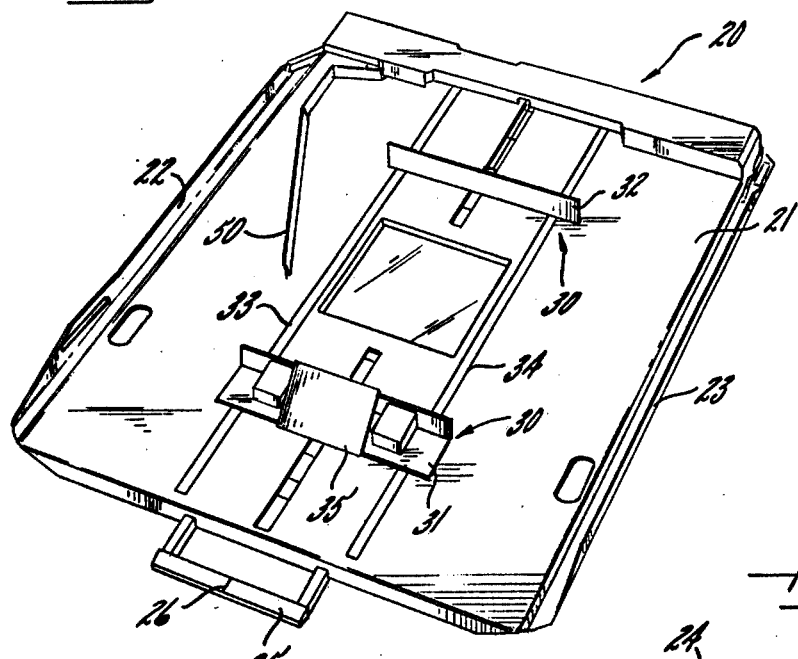
FIG. 1 is a perspective view of a standard cassette size sensing tray with cassette removed.
Figure 2:
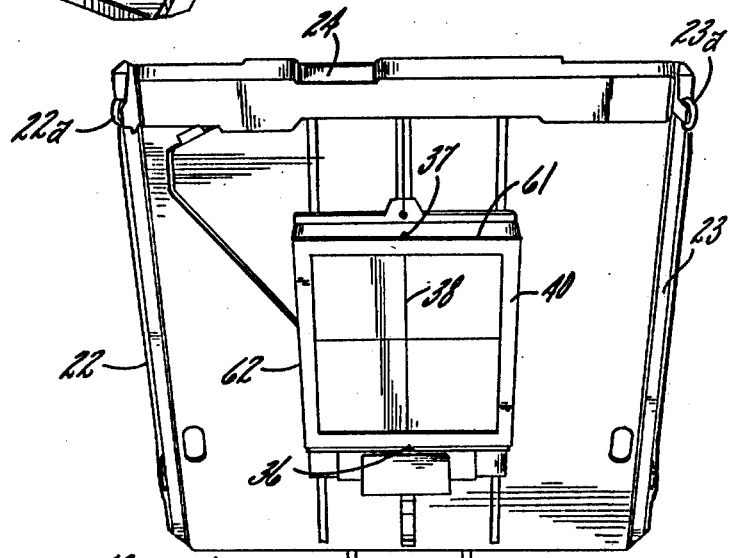
FIG. 2 is a view of the tray of FIG. 1 with cassette in position.
Figure 3:
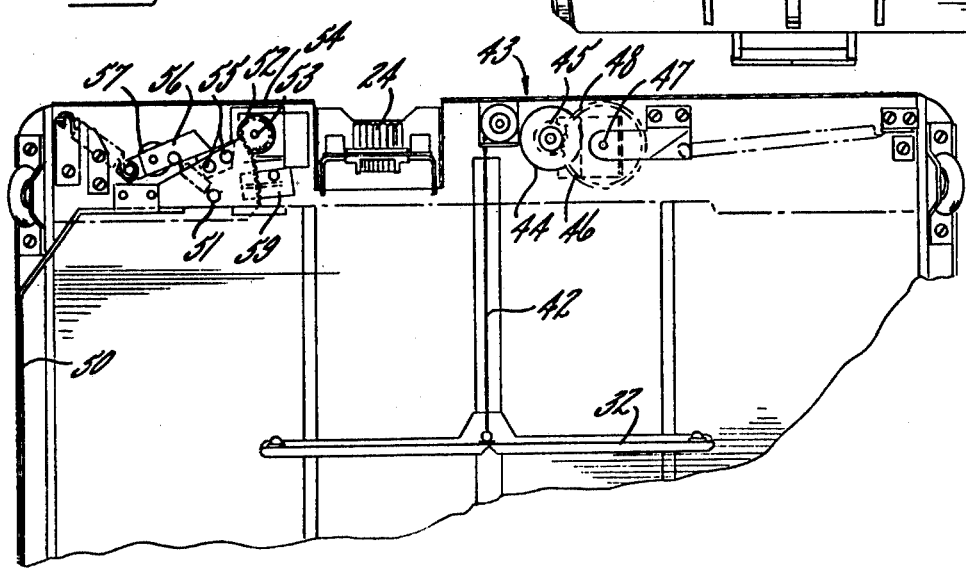
FIG. 3 is a partial plan view of the tray of FIGS. 1 and 2 showing the size sensing elements.

Turning now to the drawings, and particularly to FIGS. 1–3, there is shown a typical form of size sensing cassette holder, generally indicated at 20, capable of producing a pair of analog voltages indicating the location of a cross and long edge of an inserted cassette. The tray 20 includes a planar support surface 21 having a pair of rails 22, 23 and guide rollers 22a, 23a which mate complementary tracks in an X-ray bucky for positioning the tray with cassette below the X-ray table in the exposure position. A connector 24 (FIGS. 2 and 3) mates a receptacle in the bucky for carrying electrical signals between the tray and the collimator control system to be described below. A handle 25 is provided to allow the operator easy access to the tray for inserting it and removing it from the bucky. The handle has a centering mark 26 for centering the collimator beam over the tray.

A clamping mechanism generally indicated at 30 is provided for locking a cassette onto the tray. In the illustrated embodiment the clamping mechanism is of the self-centering variety, including a front slider 31 and a rear slider 32. Such sliders ride on tracks 33, 34 and are mechanically linked below the surface 21 such that they move in unison but in opposite directions toward or away from the center of the tray. The forward slider 31 includes a locking mechanism 35 which can be depressed by an operator to lock the self-centering guides in any position.

For centering the cassette in the long direction the guides 31, 32 are provided with centering notches 36, 37 (see FIG. 2). Thus, in order to center a cassette 40 in the tray it is necessary to position the cassette 40 on the planar surface 21, to align the notches 36, 37 with centering marks 38 on the cassette, then to close the longitudinal clamp 30 until the members 31, 32 engage the longitudinal edges of the cassette, whereupon the clamp 35 is actuated to lock the cassette into position.

Unfortunately, however, it is not at all uncommon for the cassette thus locked in position to move after being positioned, but before the X-ray exposure is made. Since the tray is slid into the bucky after positioning the cassette, the X-ray technician has no visual contact with the cassette and cannot see that it has moved. As noted above, the result is the potential for improper exposures requiring retakes and additional radiation dosage to the patient.

The tray 20 is equipped with means for producing a pair of analog voltages corresponding to the location of a long and cross edge of an inserted cassette 40. To that end, and referring to FIG. 3, a cable 42 interconnects the slider 32 to a gearing and pulley arrangement generally indicated at 43. The cable 42 wraps a pulley 44 which shares a common shaft with gear 45. The gear, in turn, mates gear 46 which rides on shaft 47 of a potentiometer 48. With this arrangement, moving the self-centering locking mechanism 30 serves to rotate the pulley 44, with the result being the rotation of the shaft of potentiometer 48. Accordingly, with a known voltage impressed on the potentiometer 48, the voltage read at the wiper thereof indicates the position of the clamp mechanism 30. When a cassette is properly inserted, since the clamp member 32 contacts the cross position detecting edge 61 (sometimes hereinafter referred to as the cross edge), the voltage at the wiper of potentiometer 48 is a measure of the position of that edge.

For sensing the position of the cassette in the long direction, means are provided for sensing a long size sensing edge 62 (long edge) shown herein as side arm 50. When the tray is inserted in a bucky the side arm is moved from its rest position shown in FIG. 3 into contact with the edge 62 of the cassette 40 as shown in FIG. 2. The side arm carries a gear segment 51 which mates a gear 52 mounted on a shaft 53 of potentiometer 54. The gear segment 51, in turn, is attached at 55 to a cam 56 mounted on a pivot 57. Inserting the tray into the bucky causes pressure on the cam 57 which pivots the arm 50 until it contacts the cassette edge. Pivoting of the arm serves to rotate the gear segment 51, consequently rotating the gear 53 and adjusting the potentiometer 54 in accordance with the position of the arm 50. Finally, a switch 59 is arranged for actuation by movement of the arm 50 as the tray is slid into the bucky. As noted previously the connector 24 supplies electrical connections between the potentiometers and the switch to the collimator control circuitry.

Conventionally the analog voltages produced by the potentiometers 48, 54 are used directly in establishing the position of the long and cross collimator blades. Thus, the size of the X-ray field in this system would be determined by the edges 61, 62 of the cassette 40. In the event the cassette is properly centered all would be well. However, if the cassette is off-center or not properly clamped the result would be an X-ray field which differed from the size and/or location of the film within the cassette. The result, depending upon the nature of the error, would be overexposure or underframing.

The effect of positioning errors can be better understood with reference to FIG. 4 which shows, in schematic form, a diagnostic X-ray system. There is shown an X-ray table 60 with a patient 69 positioned thereon. Supported beneath the table 60 is a bucky 68 which carries a cassette tray 20 with a cassette 40 loaded therein. Above the patient is an X-ray source 64 energizable to expose the film held within the cassette 40. Cross dimension collimator blades 65, 66 are schematically illustrated, serving to control the size in the cross dimension of the emitted X-ray beam. A similar pair of blades are provided for the long dimension. Conventionally the position of the blades 65, 66 as well as the corresponding pair for the long dimension are controlled in response to the analog voltages produced by the potentiometers 44, 54. The collimator control 63 also emits a light beam usable in positioning the X-ray source before exposure, a portion of the beam shown at 67 serving to illuminate the handle 25 of the cassette tray. The operator aligns the beam 67 with the centering mark 26 on the handle 25, thus assuring that the X-ray source is centered with respect to the cassette tray in the long dimension.

With the cassette properly centered as illustrated in FIG. 4 the collimator blades are adjusted to the correct position to limit the dimensions of the X-ray field to the area of the patient being studied and under which there is located an unexposed film in the cassette 40. Two problems can result if the cassette is not properly centered. Assuming that the edge 61 of the cassette is the one being sensed to produce the analog voltage, if the cassette were off-center to the right of the illustrated position the produced analog voltage would indicate that the cassette were larger than its actual size. As a result the collimator blades 65, 66 would open wider exposing a greater area of the patient to radiation. In addition, the film would be off-center to the right thereby missing a portion of the area of interest on the left of the patient. If the cassette were off-center in the opposite direction, that is to the left of the illustrated position, the produced analog voltage would tend to indicate that the cassette were smaller than its actual size. As a result, the collimator blades 65, 66 would not be opened sufficiently, failing to expose the entire film and thus underframing the exposure, and missing a portion of the desired information.

In accordance with the invention means are provided for detecting cassette positioning errors and providing the technician an indication thereof. FIG. 5 shows in block diagram form such an improved cassette position monitor.

For illustrating that the system can function with more than a single cassette and cassette holder, FIG. 5 shows a plurality of cassette trays 100, 101, 102 each having means for producing a pair of analog voltages indicating the location of a pair of edges of a cassette in the cassette holder. Those voltages are coupled to a cassette tray select circuit 104 which simply passes the voltages from the cassette in use to the subsequent circuitry. The analog voltage corresponding to the cross edge is fed to a cross size comparator 105, while the analog voltage corresponding to the long side is coupled to a long size comparator 106. Each of the comparators 105, 106 is provided with a plurality of reference voltages, such voltages corresponding to the analog voltages produced by standard size cassettes. As will become more apparent, when used herein the term "standard size cassette" refers to any cassette of predetermined size, whether or not it is considered "standard" by any particular laboratory.

In greater detail the cross size reference 108 includes means for setting a plurality of reference voltages, such reference voltages corresponding to an associated plurality of cassettes of predetermined size. Similarly, the long size reference 109 sets a plurality of references for the long size comparator 106. When a cassette is properly centered in its holder both the cross and long size comparators 105, 106 will be satisfied. However, if the cassette is offset from center, the analog voltage produced will not correspond with a cassette of standard size and thus one or both of the comparators 105, 106 will not be satisfied. Logic circuitry generally indicated at 110 is provided to monitor the outputs of the comparators 105, 106. Since the comparators are arranged to produce digital signals, the logic and succeeding circuitry is digital in nature.

To prevent exposure in the absence of a properly centered cassette, inhibiting means 111 are provided, responsive to the logic circuitry and connected to the exposure circuit and the X-ray generator. In the case where one or both of the comparators 105, 106 are not satisfied, the logic circuitry 110 produces a signal which energizes the inhibiting means to prevent an exposure. Indicators are provided, exemplified in FIG. 5 by a cassette fault light 112 and an exposure hold light 113, both driven by the logic circuitry to indicate the nature of the fault to the technician. For purposes of confirmation a pair of digital displays 114, 115 are provided to display the size of the cassette then in position. Not only does this provide verification to the technician that the proper size cassette is in place, but it also shows that the cassette is properly oriented.

Figure 6B:
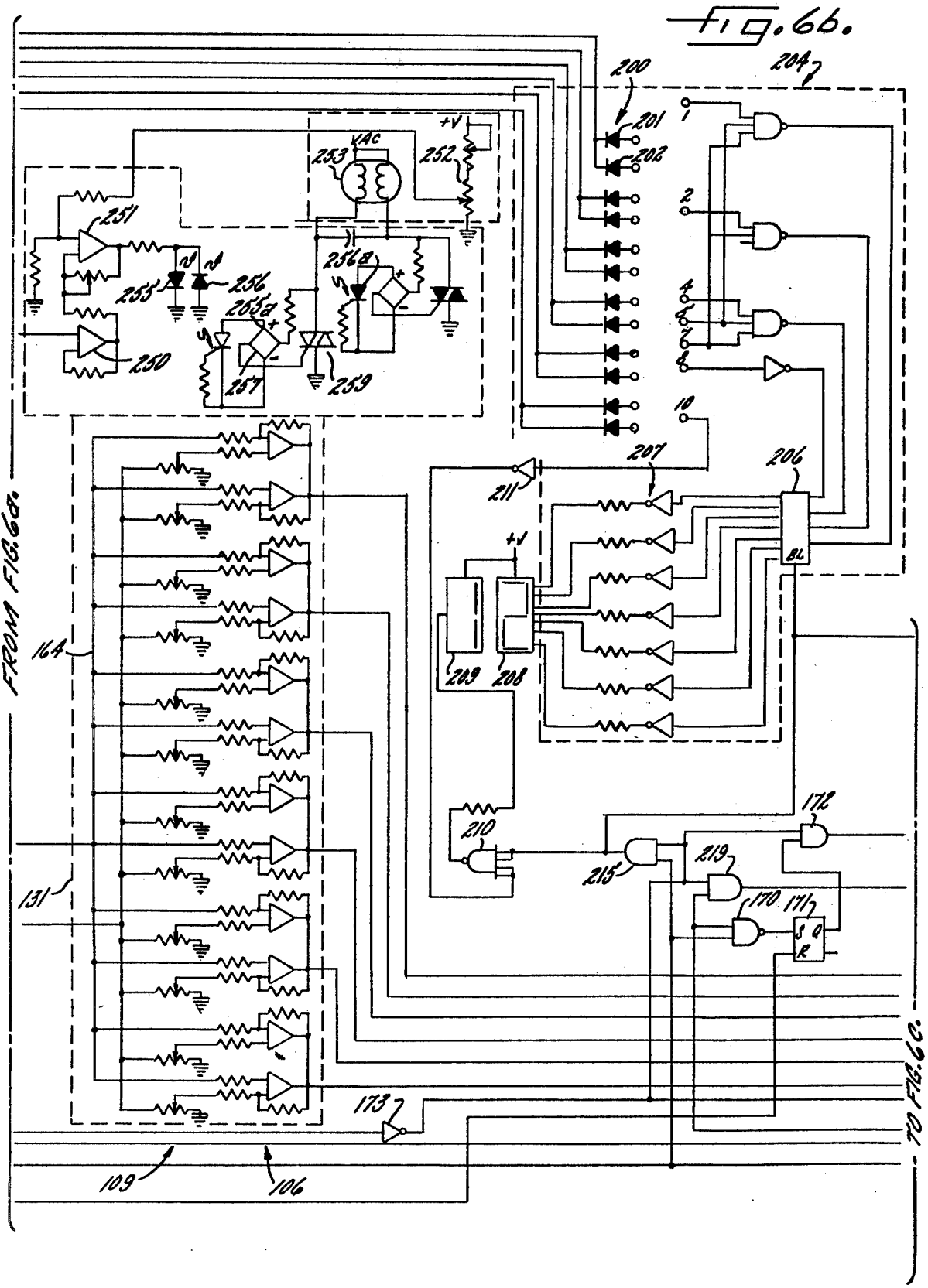

Turning now to FIGS. 6a-c, there is shown the circuitry for the improved cassette position monitor and collimator control described in general terms above. The electrical components of the cassette size sensing tray are shown in dashed lines at 20, 20a, and include the potentiometers 48, 54 and the switch 59. The potentiometers 48, 54 are supplied with a reference source of voltage 120 which is also supplied to a plurality of cross size window detectors 130 and a plurality of long size window detectors 131. Using the same voltage source for the sensing potentiometers as well as the respective window detectors prevents factors such as power supply drift from affecting the accuracy of the comparisons.

The cross size circuitry will now be described in detail with the understanding that the long size circuitry is substantially a duplicate thereof. The illustrated cross size window detectors 130 include both the elements of the cross size monitor 105 and of the cross size reference 108. The window detector module 130 includes a plurality of individual window detectors 140–145 for responding to voltages corresponding to standard or predetermined cassette sizes. Each of the window detectors, for example detector 140, comprises a pair of voltage comparators 150, 151. Preferably the voltage comparators are National Semiconductor type LM-339 which are high gain operational amplifiers without frequency compensation. Conventional operational amplifiers can also be used. The outputs of the comparators are connected together and tied to the positive supply through a pull-up resistor 153. Means are provided for establishing a window for the detector, in the illustrated embodiment by means of biasing networks 154, 155 connected to inputs of the respective comparators 150, 151. Each of the comparators has an analog voltage presented thereto which is produced by the cross size measuring potentiometer 48. It is seen that the wiper arm of the potentiometer is connected via a unity gain amplifier 156 to a bus 157, that bus supplying an input of each of the comparators in the window detector module 130. The biasing means 154, 155 are set to establish a narrow window in which the paired comparators or amplifiers 150, 151 will respond by producing a characteristic digital signal. In the illustrated embodiment the amplifier 150 sets an upper range for the window while the amplifier 151 sets a lower range. Thus, when the voltage on the bus 157 is more positive than that at the wiper of potentiometer 154, the inverting input of amplifier 150 will control and pull the combined amplifier outputs low. Similarly, when the voltage on bus 157 is less positive than the voltage established at the wiper of potentiometer 155, the reference voltage on the inverting input of amplifier 151 will control and pull the combined amplifier outputs low. However, when the voltage on the bus 157 is less positive than that established by potentiometer 154 but more positive than that established by potentiometer 155, the non-inverting inputs of both amplifiers will control and drive the combined output thereof high. That high digital signal indicates to the remaining circuitry that the window detector in question has been actuated.

Each of the window detectors 140–145 has its biasing means arranged to establish respective windows corresponding to associated ones of a plurality of predetermined or standard cassette sizes. For example, the window detector 140 may be set to detect a cassette having a five inch cross dimension, detector 141 eight inches, detector 142 ten inches, detector 143 eleven inches, detector 144 fourteen inches and detector 148 seventeen inches. It will now be apparent that the window detectors can be arranged to respond to any cassette of predetermined size, including those not normally considered standard in the industry.

As described above the windows can be established by appropriate adjustments of the potentiometers 154, 155 etc. In one practical embodiment of the invention, the windows are preferably made about 0.6 volts wide, establishing a tolerance of about 3/16 inches for cassette positioning. Thus, if window detector 141 is arranged to detect a cassette with an 8 inch cross dimension, if that cassette is inserted in the tray and positioned within 3/32 of center position (a total tolerance of 3/16 inch) the window detector 141 will be activated. If a cassette is not properly centered the window detector will not be activated and the characteristic digital signal will not be produced.

It is desirable in many circumstances, rather than providing adjustable potentiometers 154, 155, etc., for establishing the windows, that fixed precision resistor networks be used. Alignment of the system in that case becomes simpler because the plurality of reference voltages is preset with precision and need not be fine tuned. Each of the potentiometers 154, etc., can be replaced with a precision voltage divider, or alternatively a precision ladder network (say of 1% tolerance) used with a plurality of taps, one of the taps being connected to the associated input of each of the amplifiers.

In carrying out the invention fault detector means are responsive to the digital signals produced by the window detectors for providing an indication of cassette position fault in the absence of a properly centered cassette. To that end, the digital output of the window detectors are inverted by inverters 161 and applied as inputs to a multiple input NAND gate 160. For example, the combined outputs of amplifiers 150, 151 are coupled to the input of an inverter 161a and thence to an input of NAND gate 160. Accordingly, when none of the window detectors are satisfied, all of the outputs are low, and therefore all of the outputs of the inverters 161 are high, satisfying NAND gate 160 and maintaining its output low. However, in the condition when any of the window detectors are satisfied, the corresponding inverter output will be driven low, causing the output of NAND gate 160 to swing high.

Before looking to the circuitry which monitors the output of the multiple input NAND gate, it will be noted that the long size sensing circuitry is arranged in an identical manner. The potentiometer 54 is coupled via a unity gain amplifier 163 to a bus 164 in the window detector module 131. The module 131 includes a plurality of window detectors 106 and a plurality of analog reference sources 109, the outputs of the window detectors being adapted to produce a characteristic digital signal when actuated. The detector outputs are coupled via inverters 165 to associated inputs of a multiple input NAND gate 166, similar to gate 160.

The outputs of both NAND gates 160 and 166 are coupled as inputs to a two input NAND gate 170 (see FIG. 6b). When both long and cross window detectors are satisfied the outputs of NAND gates 160, 166 will be high, maintaining the output of NAND gate 170 low. However, if either the long or cross window detector remains unactuated the output of the associated NAND gate 160, 166 will be low, causing the output of NAND gate 170 to swing high. That high signal will set a flip-flop 171, driving the Q output thereof high, that high being coupled as an input to an AND gate 172. The second input of AND gate 172 is driven via inverter 173 by the sensing switch 59 in the cassette tray. Accordingly, when a cassette is in position and the tray inserted in the bucky the switch 59 will be closed, coupling a ground signal to the input of inverter 173, which in turn provides a high to the associated input of AND gate 172. With flip-flop 171 set, indicating that one of the window detectors has not been activated, the output of AND gate 172 will be high, acting through inverter 175 to illuminate the cassette fault indicators 176. The output of inverter 175 is also coupled through a pair of inverters 177, 178 to energize a relay 179 which, in turn, disables the X-ray generator 180. Thus, if a position fault is detected an appropriate indicator will be illuminated and the X-ray generator disabled.

It is also seen that the outputs of NAND gates 160, 165 drive associated indicators 168, 169. When the output of one of the gates is low indicating that the window detectors have detected a position fault, the associated indicator will be illuminated. Accordingly, illumination of the indicators 176 along with either indicator 168 or 169 will not only show that there is a cassette position fault, but also whether the fault is in the long or cross direction.

The output of inverter 173 in addition to gating the fault signals through the circuitry just described, also serves to disable the servo drive when the tray is not in the bucky or a cassette is not in the tray. This function is indicated by the output of inverter 173 being coupled to servo drive disable circuitry 173a.

As a subsidiary feature of the invention, the flip-flop 171 in conjunction with a monostable multivibrator 182 function as lockout means to prevent the clearing of a fault condition until the technician has examined the cassette in the tray. It is seen that the switch 59 is coupled to the trigger input of the multivibrator 182 which may be a commercially available type 555. Thus, when the tray is slid into the bucky with a cassette in place, the switch 59 is closed triggering the multivibrator 182 to drive the Q output thereof high. It is seen that the Q output is tied to the reset input of flip-flop 171, such that the flip-flop is reset each time the tray is slid into the bucky. At the time the Q output is driven low, disabling the AND gate 172 and preventing the illumination of the indicators 176 or the disabling of the X-ray generator 180. After a predetermined time interval the Q output of the multivibrator 182 drops low, removing the reset input. At that time if a cassette fault is detected the AND gate 170 will be satisfied, setting the flip-flop 171 to illuminate the indicators 176 and disable the X-ray generator 180. That condition can be cleared only by removing the tray from the bucky and re-inserting the tray whereupon the flip-flop 171 will be reset to allow further operation. This feature not only forces the technician to view the source of the problem, but prevents movement of a cassette in the tray from accidentally satisfying a window detector after a position fault has been detected.

As a further aid to the technician the system provides a digital display of the detected size of the cassette in the tray. To that end the outputs of the window detectors within module 130 are coupled to a decoder, in the illustrated embodiment shown as a diode decoder 200. Each of the window detectors is provided a pair of diodes in the decoder, for example detector 140 being provided diodes 201, 202. Physically arranged near the diode terminals are input terminals to encoding circuitry 204. Such circuitry, in the illustrated embodiment, comprises an arrangement of NAND gates serving as a decimal to binary encoder. The numbers adjacent the input terminals indicate the decimal number which will cause output of the appropriate binary representation. For example, if the detector 140 is adapted to sense a cassette having a cross size dimension of five inches, the terminal 201 will be connected to the decimal 5 terminal which causes the encoding circuitry 204 to produce at the output thereof the binary representation of 5. The binary encoder output is coupled to a binary to 7 segment decoder 206 having drivers 207 associated therewith to drive a 7 segment display 208. Thus, if the window detector 140 were activated the number 5 would appear in the display 208.

The illustrated display is of the 1½ digit variety, wherein the second digit 209 can assume only the condition 0 or 1, or alternatively blank or 1. The second digit is driven by a NAND gate 210 having a first input driven via inverter 211 from the 10 digit terminal in the encoder. Accordingly, when the 10 digit terminal has a low applied thereto from an appropriate diode within decoder 200 the numeral 1 will be illuminated in the display 209 along with whatever other numeral is illuminated in display 208. In the event the system is configured to measure in centimeters, a full 2 digit display will be provided including a further binary to 7 segment decoder similar to decoder 206.

In order to prevent the display of false information, means are provided for blanking the output in the event the associated detector arrangement has no window detector satisfied. To that end an AND gate 215 has a first input driven from the output of NAND gate 160 and a second input driven by inverter 173, which it is recalled, is high whenever the tray carrying a cassette is in the bucky. Accordingly, if one of the detectors within module 130 is satisfied the output of NAND gate 160 will also be high satisfying AND gate 215. As a result no blanking will take place, the output of AND gate 215 being coupled to the blanking input of decoder 206, disabling that blanking input, and also being coupled as an input to NAND gate 210, enabling that NAND gate. However, if no detector within the module 130 is satisfied, the output of NAND gate 160 will be low, causing the output of AND gate 215 to be high, disabling NAND gate 210 and blanking the decoder 206. As a result, the display will remain dark.

Corresponding circuitry for the long size monitor has not been shown in detail since it corresponds with that described above. Suffice it to say that the outputs of the window detectors within the module 131 are coupled via inverter 165 to decoding and display circuitry schematically indicated at 217. The AND gate 219 performs a function similar to AND gate 215.

In accordance with one feature of the invention the collimator servo system is driven from a plurality of preset references digitally selected in dependence upon the sensed cassette size. Referring again to the cross size circuitry, it is seen that the outputs of the respective window detectors within module 130 are coupled to the control inputs of associated bilateral MOS FET switches 230, 235. Accordingly, when one of the window detectors, for example 142 is actuated to drive its output high, the associated MOS FET switch 232 will be turned on. The MOS FET switches 230–235 each have a terminal coupled to a bus 236 which acts as a source of reference potential. Associated with the switches 230–235 are a plurality of reference setting means 240–245 in the form of potentiometers, precision voltage dividers or preferably a precision ladder network. The voltage produced at the output of the reference source, for example at the wiper of potentiometer 240 is set to the analog level which will cause the servo system to adjust the collimator blades to the opening corresponding to the size sensed by the window detector. Thus, in the illustrated embodiment the reference source 240 will be set at the voltage corresponding to a five inch cassette, 241 to a seven inch cassette and so on. In the normal condition all of the switches 230–235 are off. However, when one of the window detectors is activated the associated switch will be turned on to couple the voltage on bus 236 through the reference setting means, thereby applying the output taken from the tap or wiper through an isolating diode to the input of an amplifier 250. It is emphasized that while the particular reference corresponds to the cassette size in the tray, the voltage is not directly responsive to that produced by the size sensing potentiometer, but is accurately preset and selected by the actuated window detector.

The amplifier 250 is the input amplifier to the collimator servo system and drives a summing amplifier 251. The amplifier 251 sums the signal from amplifier 250 (corresponding to the desired collimator opening) with the signal from a potentiometer 252 driven by a motor 253 which controls the collimator blades. Accordingly, the potentiometer 252 provides feedback indicating the collimator blade position. When the feedback signal equals the reference voltage the amplifier 251 is at null and the collimator blades are set at the selected size.

Connected to the output of the amplifier 251 are a pair of light emitting diodes 255, 256 which form the input means of a pair of opto-isolators containing photo-responsive SCR's 255a, 256a. Accordingly, when the light emitting diode such as 255 is illuminated the associated photo SCR 255a will conduct.

Coupled across the outputs of photo SCR's are associated diode bridges 257, 258 arranged in the gating circuitry of associated triacs, 259, 260. The triacs in turn are coupled to the respective windings of the motor 253 such that causing triac 259 to conduct will rotate the motor in one direction, while causing triac 260 to conduct will rotate the motor in the opposite direction.

In operation, assuming the amplifier 251 output is off null in the positive direction, the LED 255 will be illuminated causing the photo SCR 255a to conduct. The SCR being connected to the d.c. terminals of the bridge 257 causes increased current flow in the a.c. terminals thereof, such current flow being sufficient to gate on the triac 259. Accordingly, the motor 253 will rotate, adjusting the collimator blades and the potentiometer 252 therewith. Ultimately, the output of amplifier 251 will reach a null, extinguishing the LED 255, and stopping motor rotation. The LED 256 operates with photo SCR 256a, diode bridge 258 and triac 260 to rotate the motor in the opposite direction when the output of amplifier 251 is below null.

A similar servo system is provided for the long size collimator blades, including a plurality of digitally selectable analog references 270 and a servo system 271.

The servo reference voltage which is impressed on bus 236 and is coupled to both the cross size servo reference means 240–245 and the long size servo reference means 270 is preferably adjustable in dependence upon the source to image distance, that is the distance between the point X-ray source and the plane of the film in the cassette. Accordingly, a potentiometer 280 is provided mechanically geared to the X-ray source module in the tower, thereby to produce a voltage dependent upon the position of the X-ray source. Since the film plane is fixed when using the bucky shown in FIG. 4, the voltage thus produced corresponds to the source to image distance. That voltage is coupled to an amplifier 281 which drives the bus 236, thereby to adjust the reference voltage in dependence upon the source to image distance. Accordingly, the collimator blades will be adjusted by the servo system not only to correspond to the selected cassette size, but also to correspond to the position of the X-ray source on the tower.

I claim as my invention:

1. A cassette position monitor for use in a diagnostic X-ray system having a collimator for controlling an X-ray beam, and a cassette tray with means for producing first and second analog voltages indicative of the long and cross positions respectively of a cassette in the tray, said cassette position monitor comprising in combination, a plurality of detector means responsive to the respective analog voltages, means for establishing windows for the respective detector means which correspond to predetermined cassette sizes so that each detector produces a characteristic digital output in the presence of a substantially centered cassette of the associated size, fault detector means for sensing the absence of said characteristic digital output, and indication means responsive to the fault detector means for providing an indication of cassette position fault.

2. The combination as set forth in claim 1 including display means responsive to the detector means and responsive to said digital output for indicating the size of the cassette in the holder.

3. The combination as set forth in claim 2 including means responsive to the fault detector means for blanking the display means in the absence of said characteristic digital output.

4. The combination as set forth in claim 2 including decoding means interposed between the detector means and said display for responding to said digital output to indicate the cassette size corresponding to an activated one of said detector means.

5. The combination as set forth in claim 1 wherein the detector means include a plurality of paired operational amplifiers, means combining the outputs of the amplifiers in each pair, means for feeding the produced analog voltage to an input of each said amplifier, said means for establishing windows including means biasing said amplifiers to establish a narrow band for the produced voltage in which said paired amplifiers respond by producing said characteristic digital output.

6. The combination as set forth in claim 1 including servo means for controlling the collimator, a plurality of servo references corresponding to said predetermined cassette sizes, and means responsive to the detector means for selecting the servo reference corresponding to an activated comparator thereby to digitally select the servo reference for controlling the collimator.

7. The combination as set forth in claim 6 further including source to image distance reference means for modifying the servo references in dependence upon the distance between the X-ray source and the cassette film plane.

8. A cassette position monitor for use in a diagnostic X-ray system having a collimator for controlling an X-ray beam, and having a cassette holder including means for producing first and second analog voltages indicative of the positions of first and second edges of a cassette in the holder, said position monitor comprising in combination, a plurality of window detectors for the first and for the second edges each being associated with a respective size of a plurality of predetermined cassette sizes, means for setting the windows about the analog voltages produced when the associated predetermined size cassette is substantially centered in the holder so that a non-centered cassette will fail to actuate the associated window detector, and fault detector means for allowing an X-ray exposure only when one of the first and one of the second window detectors are actuated.

9. The combination as set forth in claim 8 wherein the window detectors include a plurality of paired operational amplifiers, means combining the outputs of the amplifiers in each pair, means for feeding the produced analog voltage to an input of each amplifier, and means biasing said amplifiers to establish a narrow band for the produced voltage in which said paired amplifiers respond to actuate said window detector.

10. In a diagnostic X-ray system having a collimator for controlling the long and cross fields of an X-ray beam, and having a cassette holder including means for producing first and second analog voltages indicative of the positions of long and cross edges of a cassette in the holder, an improved position monitor comprising in combination, long dimension comparator means and cross dimension comparator means for monitoring the associated cassette edge for a plurality of predetermined cassette sizes, each of said comparator means having means for generating a plurality of reference analog voltages corresponding to the plurality of monitored cassette sizes, means for comparing the respective produced analog voltage to the reference voltages for detecting the presence of a substantially centered predetermined size cassette, and means responsive to said comparators for inhibiting X-ray source in the absence of a substantially centered predetermined size cassette.

11. The combination as set forth in claim 10 wherein the comparator means include a plurality of paired operational amplifiers, means combining the outputs of the amplifiers in each pair, means for feeding the produced analog voltage to an input of each amplifier, and means biasing said amplifiers to establish a narrow band for said produced voltage thereby to detect the associated size cassette when substantially centered.

12. The combination as set forth in claim 10 further including lockout means actuated upon insertion of the cassette holder into the X-ray system for maintaining the inhibited condition of the X-ray source once initiated until the cassette holder is removed from the X-ray system.

13. In a diagnostic X-ray system having a collimator for controlling the long and cross fields of an X-ray beam, and having a cassette holder including means for producing first and second analog voltages indicative of the positions of long and cross edges of a cassette in the holder, an improved position monitor comprising in combination, long dimension comparator means and cross dimension comparator means, each of said comparator means having means for generating a plurality of reference analog voltages corresponding to a plurality of predetermined cassette sizes, each of said comparator means including means for producing a characteristic digital output signal when the produced analog voltage corresponds to one of said reference analog voltages, and inhibiting means responsive to said comparator means for inhibiting an X-ray exposure in the absence of said characteristic digital signal.

14. The combination as set forth in claim 13 including display means responsive to the comparator means and responsive to said digital signal for indicating the size of the cassette in the holder.

15. The combination as set forth in claim 14 including means responsive to the inhibiting means for blanking the display means in the absence of said characteristic digital signal.

16. The combination as set forth in claim 14 including decoding means interposed between the comparator means and said display means for responding to said digital signals to indicate the cassette size corresponding to an actuated one of said comparator means.

17. The combination as set forth in claim 13 wherein the comparator means include a plurality of paired operational amplifiers, means combining the outputs of the amplifiers in each pair, means for feeding the produced analog voltage to an input of each amplifier, and means biasing said amplifiers to establish a narrow band for the produced voltage in which said paired amplifiers respond by producing said characteristic digital signal.

18. The combination as set forth in claim 13 including servo means for controlling the collimator, a plurality of servo references corresponding to said predetermined cassette sizes, and means responsive to the comparator means for selecting the servo reference corresponding to an activated comparator thereby to digitally select the servo reference for controlling the collimator.

19. The combination as set forth in claim 18 further including souce to image distance reference means for modifying the servo references in dependence upon the distance between the X-ray source and the cassette film plane.

20. In a diagnostic X-ray system having a collimator for controlling the long and cross fields of an X-ray beam and having a cassette holder including means for producing first and second analog voltages indicative of the positions of long and cross edges of a cassette in the holder, an improved digital collimator control comprising in combination, long dimension comparator means and cross dimension comparator means, each said comparator means including means for generating a plurality of analog reference voltages corresponding to a similar plurality of predetermined size cassettes, the comparator means including means for comparing the produced long and cross analog voltages against said reference voltages for producing a characteristic digital output signal when said produced voltage matches one of said references thereby indicating that the associated standard size cassette is substantially centered in the cassette holder, inhibiting means responsive to said digital output signals for preventing an X-ray exposure in the absence of said characteristic digital signal, collimator control means responsive to the comparator means for positioning the collimator in dependence upon the particular comparator means producing said characteristic digital signal, and display means coupled to the comparator means and responsive to said digital signal for displaying the cassette size.

21. The combination as set forth in claim 20 wherein the comparator means include a plurality of paired operational amplifiers, means combining the outputs of the amplifiers in each pair, means for feeding the produced analog voltage to an input of each amplifier, and means biasing said amplifiers to establish a narrow band for the produced voltage in which said paired amplifiers respond by producing said characteristic digital signal.

* * * * *